June 6, 1961
A. SINGLETON
2,987,125
CULTIVATOR STABILIZER
Filed May 21, 1958
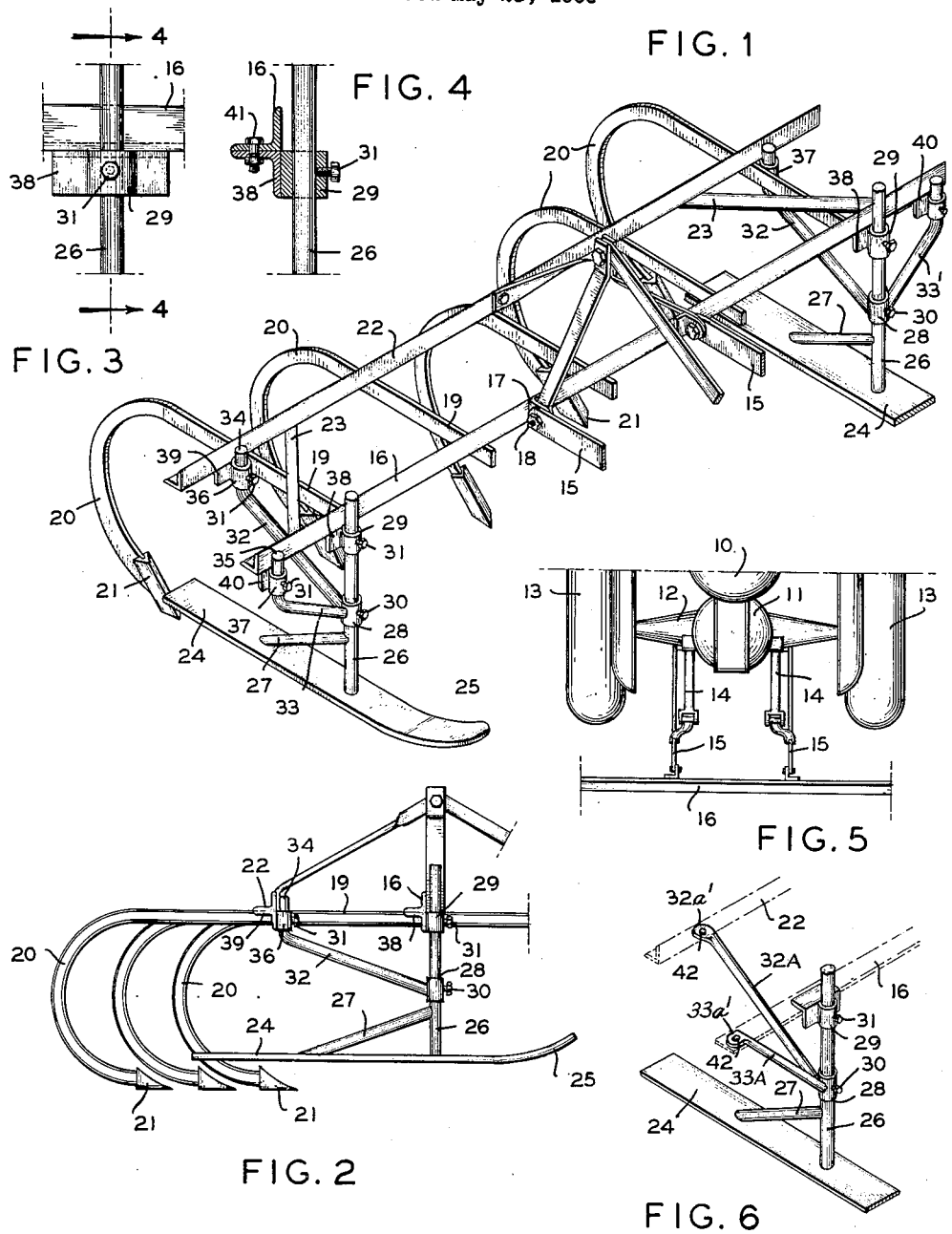
INVENTOR
AUBREY SINGLETON
BY *Ayates Dowell*,
ATTORNEY United States Patent Office 2,987,125
Patented June 6, 1961

2,987,125
CULTIVATOR STABILIZER
Aubrey Singleton, R.F.D. 3, Box 245–A, Conway, S.C.
Filed May 21, 1958, Ser. No. 736,894
2 Claims. (Cl. 172—393)

This invention relates to the cultivation of the soil and to earth working equipment, including the driving mechanism and the earth-engaging devices employed in the various operations.

The invention is concerned particularly with the manner of driving or propelling a cultivator or other earth-penetrating equipment and the means by which not only is the depth of penetration limited, but the connection between the cultivator, plow or earth-penetrating means is suitably maintained for proper operation.

Ordinarily the depth of earth-penetrating implements, such as cultivators, plows and the like, is determined by the manual control elevation of the units operated hydraulically or otherwise. Generally the cultivator or kindred unit is attached to the tractor by what is commonly called a three-point hook-up system or connection such as that produced by certain tractor manufacturers.

With this type of structure there is a degree of rigidity between the cultivator and the tractor which causes the elements of the cultivator or other devices to erratically raise and lower because of the fact that the small front wheels of the tractor travel over the depressions and mounds of the earth's terrain, causing a pivoting of the entire tractor cultivator unit about the rear wheels of the tractor. After this more or less rhythmic bucking begins it seems to continue regardless of whether the front wheels of the tractor run into depressions or over mounds.

This erratic operation interferes with and makes it substantially impossible to use the equipment with any degree of efficiency or satisfaction, it being determined that the rigidity of the connection causes transmission of the racking effect substantially to the degree of disintegration.

It is an object of the invention to overcome the difficulties enumerated, and to provide a connection which is sufficiently flexible that the racking or erratic operation will not be transmitted, but more or less will be absorbed or eliminated.

Another object of the invention is to provide a vertical stabilizer or skid which not only controls the depth of the cultivator, plows or elements upon the raising and lowering of the hydraulic lift, but in which the weight of the cultivator or other equipment is carried by the stabilizers or skids, instead of by the hydraulic lift system, whereby the connection between the tractor and the cultivator is loose or flexible.

A further object of the invention is to provide a cultivator stabilizer means which can be adjusted to vary the depth of penetration of the cultivator or other equipment.

A still further object of the invention is to provide stabilizer means for use with cultivators or other equipment, including skids adapted to be located slightly ahead of the earth-penetrating elements of the equipment and which limit the earth penetration thereof.

Other objects and advantages of the invention will be apparent from the following description taken in conjunction with the accompanying drawing wherein:

FIG. 1 is a perspective illustrating one application of the invention;

FIG. 2, an end elevation;

FIG. 3, a fragmentary front elevation of one of the mounting elements illustrating the method of attachment to a cultivator;

FIG. 4, a similar view on the line 4—4 of FIG. 3;

FIG. 5, a top plan view illustrating the manner in which the implement is attached to a tractor; and FIG. 6, a perspective of a modified form of skid.

Briefly stated, the present invention is a stabilizer and dampening device for eliminating or reducing vibration between a tractor or propelling vehicle, and a cultivator or other equipment propelled by said tractor, and includes a pair of vertically adjustable skids carried one at each side of the cultivator or propelled equipment for supporting the cultivator, limiting penetration of the cultivator or other implements into the earth and thereby maintaining the connection between the tractor and cultivator or other implement loose or flexible, so that vibrations caused by the unevenness of the terrain will not be transmitted from the tractor to the cultivator or other earthworking implements.

With continued reference to the drawing, a tractor 10 is provided having a differential 11, rear axle housing 12, and wheels 13. The tractor also is provided with lifting arms 14 and tow bars 15 for attachment to the front bar 16 of a cultivator or other implement. The bar 16 may be of angle iron construction and may be provided with a pair of apertured lugs 17 and bolts 18 for fastening the tow bars 15 and lugs. To the under surface of the bar 16 are bolted or otherwise secured upper horizontal bars 19 of a series of earth-penetrating implements, the bars 19 having adjoining curve portions 20 at the rear terminating in penetrating elements 21.

A second transverse or rear cultivator bar 22 is bolted or otherwise secured across the bars 19 in spaced relation to the front bar 16 and connected thereto by means of braces 23. The braces 23 are bolted to the horizontal flanges at each end of the front and rear bars to provide a frame to which the penetrating elements are detachably secured.

In order to stabilize the penetrating points 21 at the proper depth, and to prevent too deep or too shallow operation, spaced skids 24 are provided at opposite sides of the cultivator or other device, such skids comprising relatively long flat bars having upturned forward portions 25. Fixed substantially centrally of the upper surface of these skids are posts 26 reinforced by braces 27. About these posts are a pair of collars 28 and 29 having set screws 30 and 31 for fastening the posts 26 in fixed position within the collars 28 and 29.

At one side of the implement the collar 28 has attached thereto a pair of arms 32 and 33 having upturned outer ends 34 and 35 and received within collars 36 and 37 provided with set screws 31, identical with the set screw 31 in the collar 29. The collars 29, 36 and 37 are welded or otherwise secured to brackets 38, 39 and 40, respectively. The brackets 38 and 40 are attached to the front bar 16 by bolts and nuts 41 and the bracket 39 is attached to the rear bar 22 by bolts and nuts 41. At the opposite side of the implement the collar 28 is provided with rearwardly extending brace 32 and with a brace 33' similar to the brace 33 but extending in opposition thereto, such spaced skids serving to support opposite sides of the device.

Instead of the braces 32 and 33, braces 32A and 33A may be employed having flattened outer ends 32A' and 33A' for the reception of securing bolts 42 which may be employed to secure the braces to the bars 16 and 22. Otherwise the skid is the same.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. In combination with an implement having front and rear transverse bars longitudinally spaced apart a substantial distance, earth penetrating tools supported by said bars and means providing a pivoted towing connection to a tractor on the front transverse bar, a stabilizer support for said implement comprising a pair of relatively long skids for engaging the earth for a substantial distance forwardly of the front transverse bar and rearwardly of the rear transverse bar, an upwardly extending post located on each of said skids, a pair of upper collars adjustably mounted on the front transverse bar, each collar receiving one of said posts, means carried by said upper collars for fastening the posts in fixed adjusted position, a lower collar mounted on each of said posts in spaced relation to said upper collars, means carried by said lower collars for fastening said lower collars in fixed position on said posts, a pair of upwardly inclined braces attached to each of said lower collars, a sleeve adjustably mounted on each end portion of the front transverse bar of the implement and a sleeve adjustably mounted on each end portion of the rear transverse bar of the implement and receiving the free ends of said braces, means carried by said sleeves for fastening said braces in fixed adjusted position, the length of said skids being such as to provide a substantial ground contact at all times irrespective of the up and down movement of the tractor whereby the implement is entirely supported by said skids so that when said implement is pulled by a tractor the amount of penetration of the tools will be stabilized.

2. A pair of stabilizers for supporting an implement having longitudinally spaced front and rear transverse bars, earth penetrating tools supported by said bars and means providing a pivoted towing connection to a tractor on the front transverse bar, each stabilizer comprising an elongated skid for engaging the earth for a substantial distance forwardly of the front transverse bar and rearwardly of the rear transverse bar and in spaced relation thereto to provide a substantial ground contact irrespective of the up and down movement of the tractor, an upwardly extending post located on said skid, upper transversely adjustable collar means mounted on said front transverse bar, said collar means receiving said post, fastener means carried by said upper collar means for fixing said post in adjusted vertical position, lower collar means mounted on said post in spaced relation to said upper collar means, a pair of upwardly inclined braces attached to said lower collar means, sleeve means adjustably carried by the front and rear transverse bars of said implement and receiving the free ends of said braces, fastener means carried by said sleeve means for securing said braces in fixed adjusted position whereby the implement is entirely supported on said skids and the amount of penetration of said tools is stabilized.

References Cited in the file of this patent

UNITED STATES PATENTS

| | | |
|---|---|---|
| D. 157,137 | Foster | Feb. 7, 1950 |
| 434,433 | Dickinson | Aug. 19, 1890 |
| 640,862 | Billingsley | Jan. 9, 1900 |
| 1,172,572 | Wade | Feb. 22, 1916 |
| 1,827,237 | Jones | Oct. 13, 1931 |
| 2,429,552 | Hyland et al. | Oct. 21, 1947 |
| 2,677,321 | Ferguson | May 4, 1954 |

FOREIGN PATENTS

| | | |
|---|---|---|
| 260,479 | Switzerland | Mar. 15, 1949 |